United States Patent
Rothstein et al.

(10) Patent No.: US 9,555,725 B2
(45) Date of Patent: *Jan. 31, 2017

(54) ADJUSTABLE VEHICLE SEAT (71) Applicant: Johnson Controls GmbH, Burscheid (DE)

(72) Inventors: Gerhard Rothstein, Velbert (DE); Michael Fahl, Overath (DE)

(73) Assignee: Johnson Controls GmbH, Burscheid (DE)

( * ) Notice: Subject to any disclaimer, the term of this patent is extended or adjusted under 35 U.S.C. 154(b) by 16 days.

This patent is subject to a terminal disclaimer.

(21) Appl. No.: 14/418,320

(22) PCT Filed: Jul. 25, 2013

(86) PCT No.: PCT/EP2013/065722
§ 371 (c)(1),
(2) Date: Jan. 29, 2015

(87) PCT Pub. No.: WO2014/019931
PCT Pub. Date: Feb. 6, 2014

(65) Prior Publication Data
US 2015/0298586 A1 Oct. 22, 2015

(30) Foreign Application Priority Data
Jul. 31, 2012 (DE) .................. 10 2012 015 287

(51) Int. Cl.
*B60N 2/02* (2006.01)
*B60N 2/48* (2006.01)
(Continued)

(52) U.S. Cl.
CPC ........... *B60N 2/366* (2013.01); *B60N 2/01516* (2013.01); *B60N 2/22* (2013.01); *B60N 2/305* (2013.01);
(Continued)

(58) Field of Classification Search
CPC ........... B60N 2/01525; B60N 2/01516; B60N 2/3011; B60N 2/3059; B60N 2/366; B60N 2/22; B60N 2/305; B60N 2/309
(Continued)

(56) References Cited

U.S. PATENT DOCUMENTS

| 4,700,989 A | 10/1987 | Ercilla |
| 5,368,355 A | 11/1994 | Hayden et al. |

(Continued)

FOREIGN PATENT DOCUMENTS

| DE | 10 2004 061139 A1 | 1/2006 |
| DE | 10 2004 041 449 B3 | 3/2006 |

(Continued)

*Primary Examiner* — Chi Q Nguyen
(74) *Attorney, Agent, or Firm* — McGlew and Tuttle, P.C.

(57) ABSTRACT

An adjustable vehicle seat (1) includes a seat part (2) and a backrest (3) which is pivotable relative to the seat part via a backrest adjustment fitting (5) and is lockable in a plurality of angular positions. A locking device (90) locks the seat part to a vehicle structure. An unlocking lever (30) transmits an unlocking movement to the locking device. A first interlock element (54), with the fitting unlocked, prevents a movement of the unlocking lever for unlocking the locking device and with the locking device unlocked, prevents an unlocking of the backrest adjustment fitting. The first interlock element, as a blocking lever, is connected to a transmission rod (60) for rotation therewith, to unlock the fitting. The unlocking lever has or interacts with a blocking element (36, 37) which, when the locking device; is unlocked, prevents a movement of the blocking lever for unlocking the backrest adjustment fitting.

15 Claims, 10 Drawing Sheets

(51) Int. Cl.
    *B60N 2/36*  (2006.01)
    *B60N 2/22*  (2006.01)
    *B60N 2/30*  (2006.01)
    *B60N 2/015* (2006.01)
(52) U.S. Cl.
    CPC ............ *B60N 2/309* (2013.01); *B60N 2/3011* (2013.01); *B60N 2/3031* (2013.01); *B60N 2/3059* (2013.01); *B60N 2/01525* (2013.01)
(58) Field of Classification Search
    USPC ................. 297/378.12, 378.11, 65, 367 R, 367 L, 297/364, 365, 366
    See application file for complete search history.

(56) References Cited

U.S. PATENT DOCUMENTS

| | | | | |
|---|---|---|---|---|
| 5,393,116 | A | 2/1995 | Bolsworth et al. | |
| 6,793,285 | B1* | 9/2004 | Tame | B60N 2/3011 296/65.01 |
| 7,255,398 | B2* | 8/2007 | Tokui | B60N 2/20 297/354.12 |
| 7,325,876 | B2* | 2/2008 | Lavoie | B60N 2/01583 296/65.09 |
| 7,597,375 | B2* | 10/2009 | Takatsura | B60N 2/22 296/65.08 |
| 7,871,127 | B2* | 1/2011 | Bruck | B60N 2/20 297/378.1 |
| 2005/0023857 | A1 | 2/2005 | Lavoie | |
| 2008/0093907 | A1* | 4/2008 | Nag | B60N 2/2356 297/367 R |
| 2009/0096270 | A1* | 4/2009 | Halbig | B60N 2/206 297/378.12 |
| 2010/0244530 | A1* | 9/2010 | Kitano | B60N 2/20 297/362 |
| 2011/0115272 | A1* | 5/2011 | Kojima | B60N 2/2352 297/367 R |
| 2015/0151654 | A1* | 6/2015 | Rothstein | B60N 2/206 297/378.14 |

FOREIGN PATENT DOCUMENTS

| | | |
|---|---|---|
| DE | 10 2007 017673 B4 | 11/2010 |
| DE | 10 2010 034884 A1 | 2/2012 |
| EP | 0 047 699 A1 | 3/1982 |
| EP | 0 738 624 B1 | 4/1999 |
| GB | 2 251 183 A | 7/1992 |
| WO | 2004/069 585 A1 | 8/2004 |

* cited by examiner

ADJUSTABLE VEHICLE SEAT

CROSS REFERENCE TO RELATED APPLICATIONS

This application is a United States National Phase Application of International Application PCT/EP2013/065722 filed Jul. 25, 2013 and claims the benefit of priority under 35 U.S.C. §119 of German Patent Application DE 10 2012 015 287.6 filed Jul. 31, 2012, the entire contents of which are incorporated herein by reference.

FIELD OF THE INVENTION

The invention relates to an adjustable vehicle seat comprising a seat part and a backrest, which can be pivoted relative to the seat part about a backrest pivot axis by means of at least one backrest setting fitting and can be locked in a plurality of angular positions, and at least one locking apparatus, by means of which the seat part can be locked to a vehicle structure

BACKGROUND OF THE INVENTION

Adjustable vehicle seats which have a seat part and a backrest which is arranged pivotably on the seat part are known by use. In addition, a vehicle seat of this type has two backrest setting fittings, by means of which the backrest can be pivoted about a backrest pivot axis relative to the seat part, and by means of which the backrest can be locked to the seat part in a plurality of angular positions.

Starting from a design position, in which a passenger can be seated and the backrest is approximately vertical, the vehicle seat can be transferred into a table position, in which the backrest rests on the seat part. Here, the rear side of the backrest lies approximately horizontally and the vehicle seat has the function of a table.

Furthermore, it is known that the vehicle seat can be locked to the vehicle structure by means of two locking apparatuses which are attached in the rear region of the seat part. By way of unlocking of the two said locking apparatuses, the rear part of the vehicle seat can be released from the vehicle structure. By way of raising of the rear part of the vehicle seat and pivoting toward the front, the vehicle seat can be transferred into a tumble position, in which additional cargo area is produced.

SUMMARY OF THE INVENTION

The invention is based on the problem of improving a vehicle seat of the type mentioned at the outset, in particular of preventing simultaneous unlocking of the locking apparatuses and the backrest setting fittings.

An adjustable vehicle seat according to the invention comprises a seat part and a backrest which can be pivoted relative to the seat part about a backrest pivot axis by means of at least one backrest setting fitting and can be locked in a plurality of angular positions, and at least one locking apparatus, by means of which the seat part can be locked to a vehicle structure.

According to the invention, an unlocking lever is provided which transmits an introduced movement for unlocking to the at least one locking apparatus, a first interlocking element being provided which, when the backrest setting fitting is unlocked, prevents a movement of the unlocking lever for unlocking the locking apparatus, and which, when the locking apparatus is unlocked, prevents unlocking of the backrest setting fitting, the first interlocking element being configured as a blocking lever which is connected fixedly to a transmission rod so as to rotate with it, unlocking of the backrest setting fitting taking place during a rotation of the transmission rod, and the unlocking lever having a blocking element or interacting with a blocking element which, when the locking apparatus is unlocked, prevents a movement of the blocking lever for unlocking the backrest setting fitting.

In this way, simultaneous unlocking of the locking apparatuses and the backrest setting fittings is not possible.

Two backrest setting fittings are preferably provided here, and the transmission rod serves for simultaneous unlocking of both backrest setting fittings.

When the backrest setting fitting is unlocked, the blocking lever preferably prevents a movement of the blocking element for unlocking the locking apparatus.

A second interlocking element is advantageously provided which, when the backrest is approximately upright, prevents a movement of the unlocking lever for unlocking the locking apparatus.

Here, when the backrest rests on the seat part, the second interlocking element permits a movement of the unlocking lever for unlocking the locking apparatus, and, when the locking apparatus is unlocked, prevents a pivoting movement of the backrest relative to the seat part.

The second interlocking element is preferably configured as a leadthrough element of approximately cylindrical design and is fastened to the seat part in such a way that its cylinder axis is aligned with the backrest pivot axis.

The leadthrough element advantageously has two leadthrough openings for leading through Bowden cables. Here, the Bowden cables serve for unlocking the locking apparatuses.

On one end side, the leadthrough element has a diametrically running slot which, when the backrest rests on the seat part, is aligned with a blocking lug which is attached to the unlocking lever.

Here, when the locking apparatus is unlocked, the blocking lug is situated within the slot.

At least two locking apparatuses are preferably provided.

Precisely two locking apparatuses are particularly advantageously provided.

The unlocking lever can advantageously be pivoted about an actuating pivot axis which runs at right angles with respect to the backrest pivot axis. This results in a comparatively simple construction.

A return spring is preferably provided which loads the unlocking lever constantly in the direction of a rest position, in which the unlocking lever is situated when the locking apparatus is locked.

According to one advantageous refinement of the invention, the blocking element is designed as a blocking arm which is configured in one piece with the unlocking lever.

According to a further advantageous refinement of the invention, the blocking element is designed as a blocking segment which is configured separately from the unlocking lever.

The blocking segment and the unlocking lever are preferably mounted such that they can be pivoted about an identical actuating pivot axis.

The present invention shall be explained in more detail on the basis of the following figures and exemplary embodiments, without the present invention being limited to these. The various features of novelty which characterize the invention are pointed out with particularity in the claims annexed to and forming a part of this disclosure. For a better understanding of the invention, its operating advantages and

DESCRIPTION OF THE PREFERRED EMBODIMENTS

A vehicle seat 1 for a motor vehicle has a seat part 2 and a backrest 3. The arrangement of the vehicle seat 1 within the vehicle and its usual driving direction define the direction information used in the following text. Here, a direction which is oriented perpendicularly with respect to the ground will be called the vertical direction in the following text and a direction perpendicular with respect to the vertical direction and perpendicular with respect to the driving direction will be called the transverse direction in the following text.

The backrest 3 is attached to the seat part 2 such that it can be pivoted about a backrest pivot axis 6 which runs in the transverse direction, and comprises, inter alia, a backrest plate. By means of two backrest setting fittings 5 which are configured as latching fittings in the present case, the backrest 3 can be set in a plurality of discrete angular positions relative to the seat part 2. A backrest setting fitting of this type is disclosed, for example, in DE 10 2004 041 449 B3, the disclosure of which in this regard is incorporated here expressly.

A headrest which is of height-adjustable and inclination-adjustable configuration in the present case is attached at one end of the backrest 3, which end faces away from the seat part.

Figure 1:
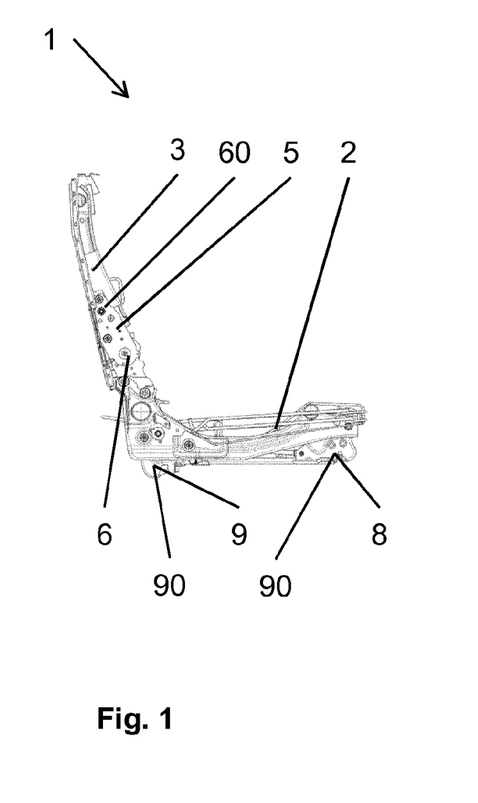
FIG. 1 is a diagrammatic illustration of a vehicle seat according to a first exemplary embodiment in the design position.
Figure 2:
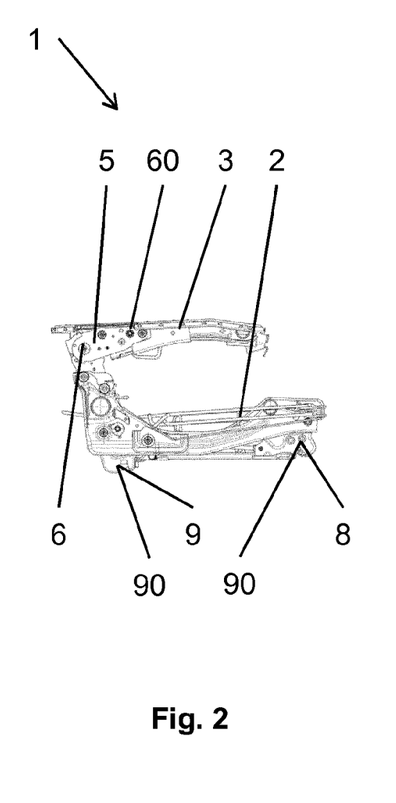
FIG. 2 is a diagrammatic illustration of the vehicle seat according to FIG. 1 in the table position.
Figure 11:
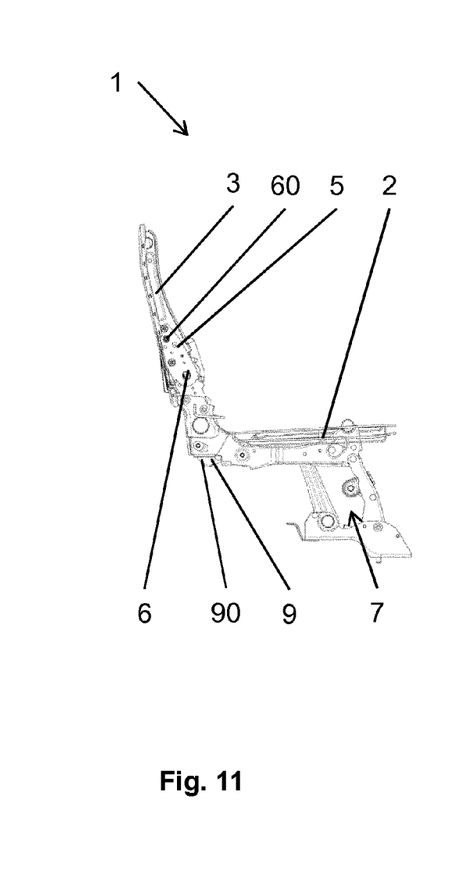
FIG. 11 is a diagrammatic illustration of a vehicle seat according to a second exemplary embodiment in the design position.
Figure 12:
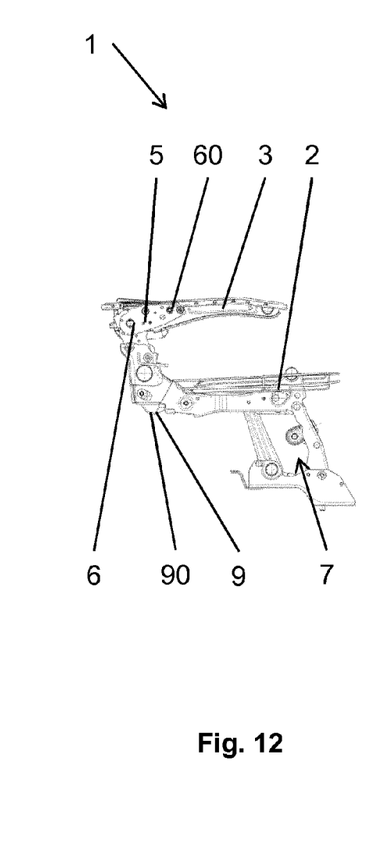
FIG. 12 is a diagrammatic illustration of the vehicle seat according to FIG. 11 in the table position.

In the design position of the vehicle seat 1 which is shown in FIG. 1 and FIG. 11, the backrest 3 is in an approximately vertical position. By way of unlocking of the backrest setting fittings 5 and pivoting of the backrest 3 into a horizontal position, the vehicle seat 1 can be transferred into a table position. In the table position which is shown in FIG. 2 and FIG. 12, the backrest 3 rests on the seat part 2 and runs approximately parallel to the latter and parallel to the vehicle floor.

According to a first exemplary embodiment which is shown in FIG. 1 to FIG. 10, the seat part 2 is connected releasably to the vehicle structure. To this end, the seat part 2 has in each case one front foot 8 on both sides in the front region in the driving direction, which front foot 8 comprises a locking apparatus 90. Furthermore, the seat part 2 has in each case one rear foot 9 on both sides in the rear region in the driving direction, which rear foot 9 comprises a locking apparatus 90. A locking apparatus of this type is disclosed, for example, in WO 2004 069 585 A1, the disclosure of which in this regard is incorporated here expressly.

In the design position and in the table position of the vehicle seat 1, the locking apparatuses 90 are locked to pins which are attached to the vehicle structure. In order to transfer the vehicle seat 1 from the table position into a tumble position, the two locking apparatuses 90 of the rear feet 9 are unlocked simultaneously, as a result of which the rear feet 9 are released from the vehicle structure.

Figure 3:
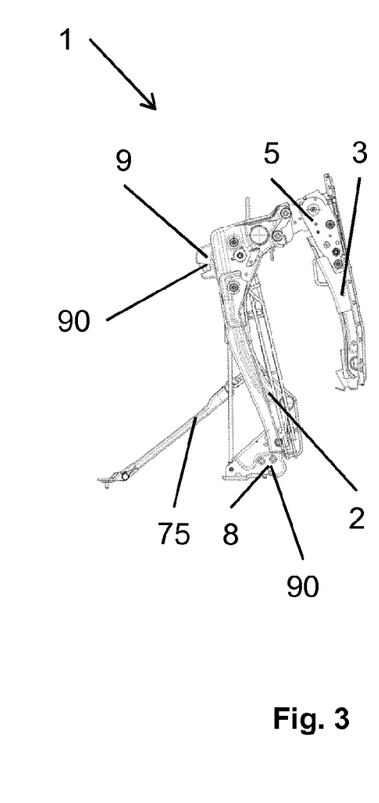
FIG. 3 is a diagrammatic illustration of a vehicle seat according to FIG. 1 in the tumble position.

In the tumble position which is shown in FIG. 3, the backrest 3 rests on the seat part 2 and runs approximately parallel to the latter. The vehicle seat 1 is folded forward and the backrest 3 and the seat part 2 are inclined relative to the vehicle floor. Here, the vehicle seat 1 is held in the tumble position by means of a strut 75.

For safety reasons, the two locking apparatuses 90 of the rear feet 9 must not be unlocked in the design position, but rather merely in the table position. In the tumble position, the locking apparatuses 90 are unlocked. The locking apparatuses 90 may therefore be unlocked only when the backrest 3 rests on the seat part 2.

For safety reasons, the two backrest setting fittings 5 must likewise not be unlocked in the tumble position, but rather merely in the table position and in the design position. The backrest setting fittings 5 may therefore be unlocked only when both locking apparatuses 90 are locked.

The vehicle seat 1 comprises an interlocking unit 50 which will be described in greater detail in the following text and which ensures that the above-described unlocking processes can be carried out only in the correspondingly defined positions of the vehicle seat 1.

A transmission rod 60 which is assigned kinematically to the backrest 3 runs parallel to the backrest pivot axis 6. The transmission rod 60 is connected to both backrest setting fittings 5 which are attached to the side of the vehicle seat 1 and serves for simultaneous unlocking of both backrest setting fittings 5. The transmission rod 60 is arranged on the front side in the driving direction of the backrest plate.

Unlocking of the backrest setting fittings 5 takes place by way of rotation of the transmission rod 60 by a predefined angle about its center axis which runs in the transverse direction. If the backrest setting fittings 5 are unlocked, the backrest 3 can be pivoted relative to the seat part 2 about the backrest pivot axis 6.

In the design position, in the table position and in the tumble position, the backrest setting fittings 5 are locked in each case. The backrest setting fittings 5 are unlocked merely during a pivoting movement of the backrest 3.

An unlocking unit is provided for simultaneous unlocking of both locking apparatuses 90 of the rear feet 9, which unlocking unit is fastened to the backrest plate and is therefore likewise assigned kinematically to the backrest 3. Here, the unlocking unit is arranged on the front side in the driving direction of the backrest plate.

The unlocking unit 10 comprises a base plate 70 which is arranged largely parallel to the backrest plate.

An unlocking lever 30 is mounted such that it can be pivoted about an actuating pivot axis 44. The orientation of the actuating pivot axis 44 changes depending on the position of the backrest 3 relative to the seat part 2. However, the actuating pivot axis 44 constantly runs approximately at right angles with respect to the backrest pivot axis 6. A return spring 61 loads the unlocking lever 30 constantly in the direction of a rest position.

On an arm which protrudes in the radial direction, the unlocking lever 30 has a belt eye 31, into which a belt strap which serves as actuating element is hooked. The belt strap runs first of all from the belt eye 31 in the vertical direction to a deflection roller 73. The belt strap is deflected on the deflection roller 73 counter to the driving direction and is guided to a belt opening in the backrest plate. The belt strap 62 is guided through the belt opening and protrudes out of the backrest 3 counter to the driving direction, that is to say toward the rear.

By way of pulling on that end of the belt strap which protrudes out of the backrest 3, the unlocking lever 30 is pivoted about the actuating pivot axis 44 in the direction of its actuating position. A limiting element (not shown) acts as a stop and limits the movement of the unlocking lever 30 after the actuating position is reached.

A control gearwheel 20 is mounted such that it can be rotated about a control pivot axis 43 which runs parallel to the actuating pivot axis 44. Approximately along half its circumference, the control gearwheel 20 has a control toothing system (not visible in the illustrations) which meshes with an unlocking toothing system 33 of the unlocking lever 30.

A first unlocking element 11 is mounted axially next to the control gearwheel 20 such that it can be rotated about the control pivot axis 43. The first unlocking element 11 has, inter alia, a cylindrical segment-like region with a first circumferential face 55, in which a first guide groove is formed. A first Bowden cable (not shown) is inserted into the first guide groove. At its end, the first Bowden cable has a first nipple which is hooked into a first Bowden cable hook-in means 13 of the first unlocking element 11.

The first Bowden cable runs from the first unlocking element 11 to a leadthrough element 80 which is fastened to the seat part 2. The first Bowden cable runs further through a first leadthrough opening 81 of the leadthrough element 80 to one of the two locking apparatuses 90 in one of the rear feet 9.

A second unlocking element (not visible in the illustrations) is likewise mounted axially next to the control gearwheel 20 such that it can be rotated about the control pivot axis 43. The second unlocking element has, inter alia, a cylindrical segment-like region with a second circumferential face, in which a second guide groove is formed. A second Bowden cable (not shown) is inserted into the second guide groove. At its end, the second Bowden cable has a second nipple which is hooked into a second Bowden cable hook-in means of the second unlocking element.

The second Bowden cable runs from the second unlocking element to the leadthrough element 80 which is fastened to the seat part 2. The second Bowden cable runs further through a second leadthrough opening 82 of the leadthrough element 80 to the other of the two locking apparatuses 90 in one of the rear feet 9.

If the unlocking unit 10 is situated in the starting position, the unlocking lever 30 is situated in the rest position, the control gearwheel 20 is situated in the locking position, the locking elements 11 are situated in the locking position, and the two locking apparatuses 90 are locked. If the unlocking unit 10 is situated in the activation position, the unlocking lever 30 is situated in the actuating position, the control gearwheel 20 is situated in the unlocking position, the unlocking elements 11 are situated in the unlocking position, and the two locking apparatuses 90 are unlocked.

A control spring (not shown) is provided between the control gearwheel 20 and the first unlocking element 11, which control spring loads the first unlocking element 11 relative to the control gearwheel 20 toward the unlocking position. A control spring is likewise provided between the control gearwheel 20 and the second unlocking element, which control spring loads the second unlocking element relative to the control gearwheel 20 toward the unlocking position. Here, the two control springs are configured in the present case as swivel pin springs and are plugged into corresponding openings in the unlocking elements 11 and the control gearwheel 20. Here, the control gearwheel 20 is arranged between the first unlocking element 11 and the second unlocking element in the axial direction with regard to the control pivot axis 43. The two control springs are situated in each case between the control gearwheel 20 and the associated unlocking element 11.

In the starting position of the unlocking unit 10, a comparatively short end of the belt strap protrudes out of the backrest 3 toward the rear. This signals to a user that both locking apparatuses 90 are locked.

By way of pulling on that end of the belt strap which protrudes out of the backrest 3, the unlocking lever 30 is pivoted in the direction of the actuating position counter to the force of the return spring 61. Here, the control gearwheel 20 is rotated in the direction of the unlocking position. After the control gearwheel 20 has passed through an idle travel, a driver 24 which is attached to the control gearwheel 20 comes into contact with a first counterstop of the first unlocking element 11 and with a second counterstop of the second unlocking element.

In the present case, the driver 24 is attached in a region of the control gearwheel 20, which region lies diametrically opposite the control toothing system, and protrudes in the axial direction on both sides from said control gearwheel 20. The counterstops of the unlocking elements 11 are configured substantially as smooth surfaces which run in the radial and axial direction.

By way of further pulling on the end of the belt strap, the control gearwheel 20 drives the unlocking elements 11, as a result of which the latter are rotated in the direction of the unlocking position. Here, pulling takes place on the Bowden cables, as a result of which the locking apparatuses 90 are unlocked. This movement ends when the unlocking lever 30 bears against the limiting element and the unlocking unit is situated in the activation position. The belt strap then protrudes comparatively far out of the backrest 3. This signals to a user that at least one of the two locking apparatuses 90 is unlocked.

If the user then releases the belt strap, the unlocking lever 30 is pivoted in the direction of the rest position by way of the force of the return spring 61. As a result, the control gearwheel 20 is also rotated in the direction of the locking position and the driver 24 moves away from the counterstops of the unlocking elements 11. The unlocking elements 11 remain in the unlocking position, on account of the loading by way of the control springs.

The movement of the unlocking lever 30 ends when a stop element 34 of the unlocking lever 30 bears against the first circumferential face 55 and/or against the second circumferential face. In the present case, the stop element 34 is attached to the arm of the unlocking lever 30. The stop element 34 is arranged closer in the radial direction to the actuating pivot axis 44 than the belt eye 31 and protrudes in the axial direction on both sides from the arm.

The unlocking lever 30 is now situated in the hold-open position and the unlocking unit 10 is situated in the display position. Although, in comparison to the activation position, the belt strap is pulled partially into the backrest 3, it still protrudes comparatively far out of the backrest 3. This signals to a user that at least one of the two locking apparatuses 90 is unlocked.

The rear feet 9 of the vehicle seat 1 can then be removed from the vehicle structure, and the vehicle seat 1 can be folded forward into the tumble position.

The vehicle seat 1 can tilt when the rear feet 9 are again placed onto the pins of the vehicle structure. Here, only one of the two locking apparatuses 90 locks to the associated pin in the vehicle structure, whereas the other of the two locking apparatuses 90 does not lock or locks only with a time delay to the assigned pin in the vehicle structure.

For example, after the rear feet are placed onto the pins, the locking apparatus 90 which is connected to the first unlocking element 11 is unlocked, and the locking apparatus 90 which is connected to the second unlocking element is locked. During locking, the locking apparatus 90 which is connected to the second unlocking element pulls on the second Bowden cable, as a result of which the second unlocking element is rotated into the locking position. However, the first unlocking element 11 remains in the unlocking position.

Here, the stop element 34 of the unlocking lever 30 loses contact with the second circumferential face, but still bears against the first circumferential face 55. The unlocking lever 30 therefore remains in the hold-open position and the belt strap still protrudes comparatively far out of the backrest 3. It is therefore signaled to a user that at least one of the two locking apparatuses 90 is unlocked.

If the locking apparatus 90 which is connected to the first unlocking element 11 now also locks, it pulls on the first Bowden cable, as a result of which the first unlocking element 11 is also rotated into the locking position. Here, the stop element 34 of the unlocking lever 30 also loses contact with the first circumferential face 55, and the unlocking lever 30 is rotated back into the rest position by way of the force of the return spring. Here, the control gearwheel 20 is also rotated back into the locking position.

The unlocking unit is therefore situated in the starting position again. Here, the belt strap is pulled by the unlocking lever 30 into the backrest 3 to such an extent that only a comparatively short end of the belt strap is still visible from the outside. This signals to a user that both locking apparatuses 90 are locked.

Close to the unlocking unit, a blocking lever 54 is attached on the transmission rod 60 and is connected fixedly to the latter so as to rotate with it. During unlocking of the backrest setting fittings 5, the blocking lever 54 is also pivoted correspondingly. The unlocking lever 30 has a blocking arm 36 which interacts with the blocking lever 54.

Figure 5:
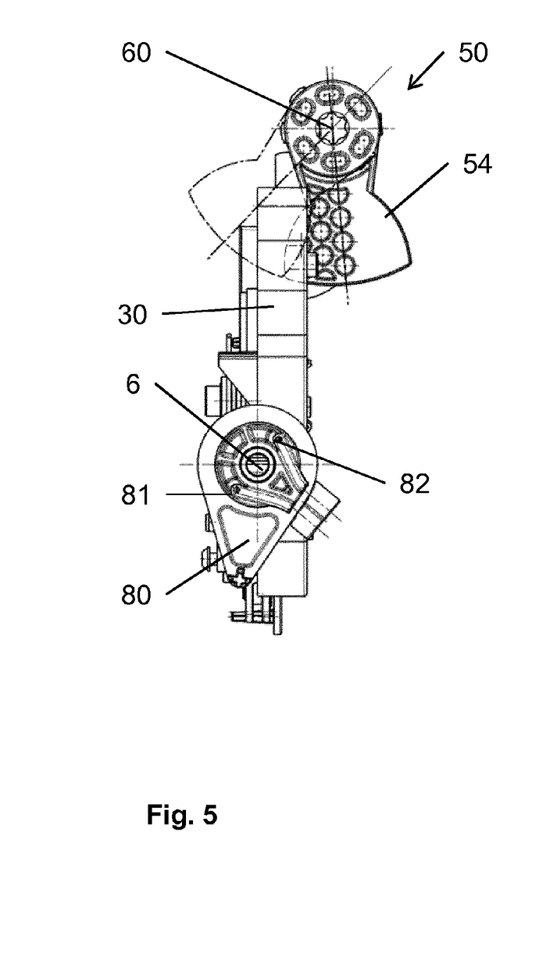
FIG. 5 is a side view of the interlocking unit according to FIG. 4 in the design position.
Figure 6:
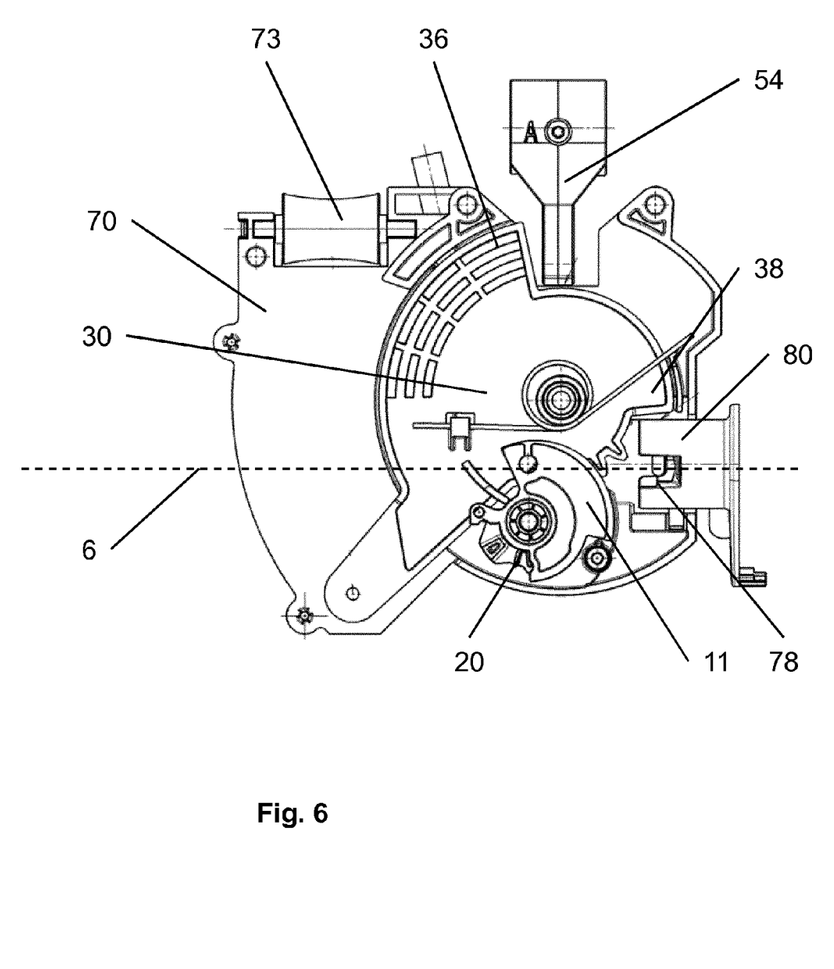
FIG. 6 is a front view of the interlocking unit according to FIG. 4 in the design position.
Figure 7:
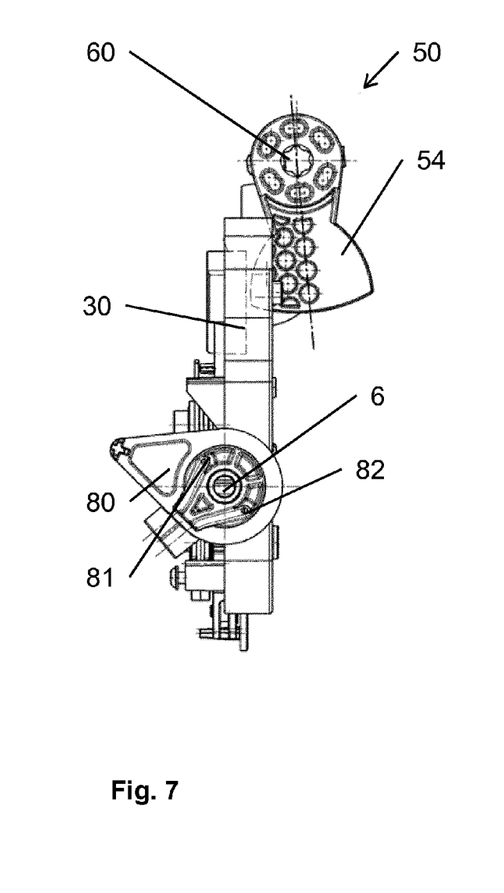
FIG. 7 is a side view of the interlocking unit according to FIG. 4 in the table position.
Figure 8:
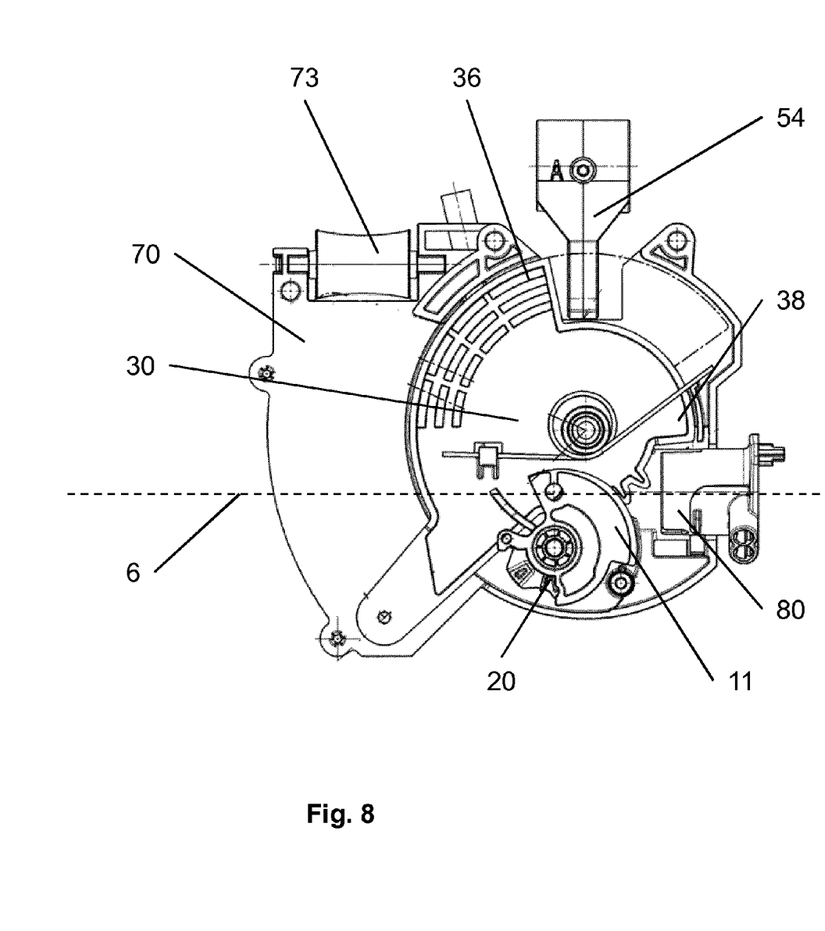
FIG. 8 is a front view of the interlocking unit according to FIG. 4 in the table position.

In the design position which is shown in FIG. 5 and FIG. 6 and in the table position which is shown in FIG. 7 and FIG. 8, the unlocking lever 30 is situated in each case in the rest position, the blocking arm 36 being situated laterally next to the blocking lever 54. During unlocking of the backrest setting fittings 5, the blocking lever 54 pivots laterally past the blocking arm 36. Unlocking of the backrest setting fittings 5 is therefore possible in the design position and in the table position of the vehicle seat 1. The blocking arm 36 likewise pivots past the blocking lever 54 during unlocking of the locking apparatuses 90. Unlocking of the locking apparatuses 90 is therefore possible in the table position of the vehicle seat 1. However, as will still be shown below, unlocking of the locking apparatuses 90 is not possible in the design position of the vehicle seat 1.

In the illustration according to FIG. 5, the blocking lever 54 is also shown additionally using dashed-dotted outlines in the pivoted state for unlocking the backrest setting fittings 5.

During the unlocking of the backrest setting fittings 5, that is to say as long as the backrest setting fittings 5 are unlocked, the blocking lever 54 is situated in front of the blocking arm 36. During the attempt to unlock the locking apparatuses 90, the blocking arm 36 of the unlocking lever 30 comes into contact with the blocking lever 54. Unlocking of the locking apparatuses 90 when the backrest setting fittings 5 are unlocked is therefore not possible.

Figure 9:
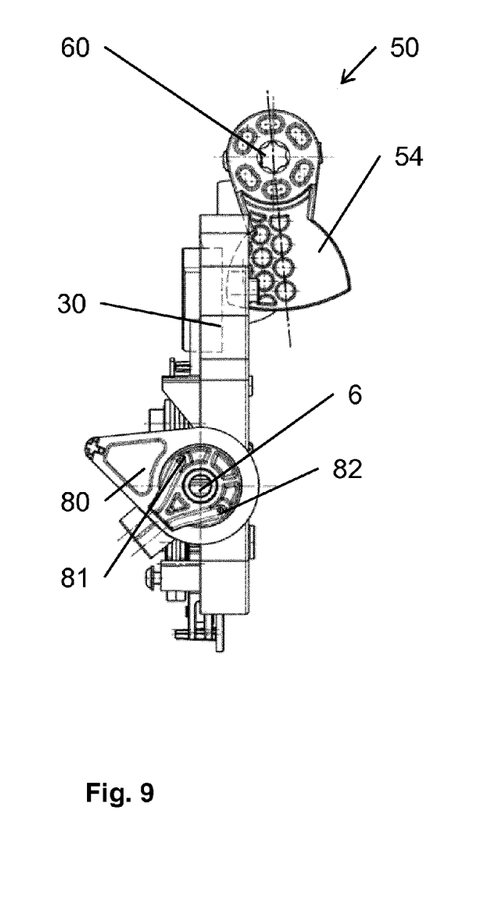
FIG. 9 is a side view of the interlocking unit according to FIG. 4 in the tumble position.
Figure 10:
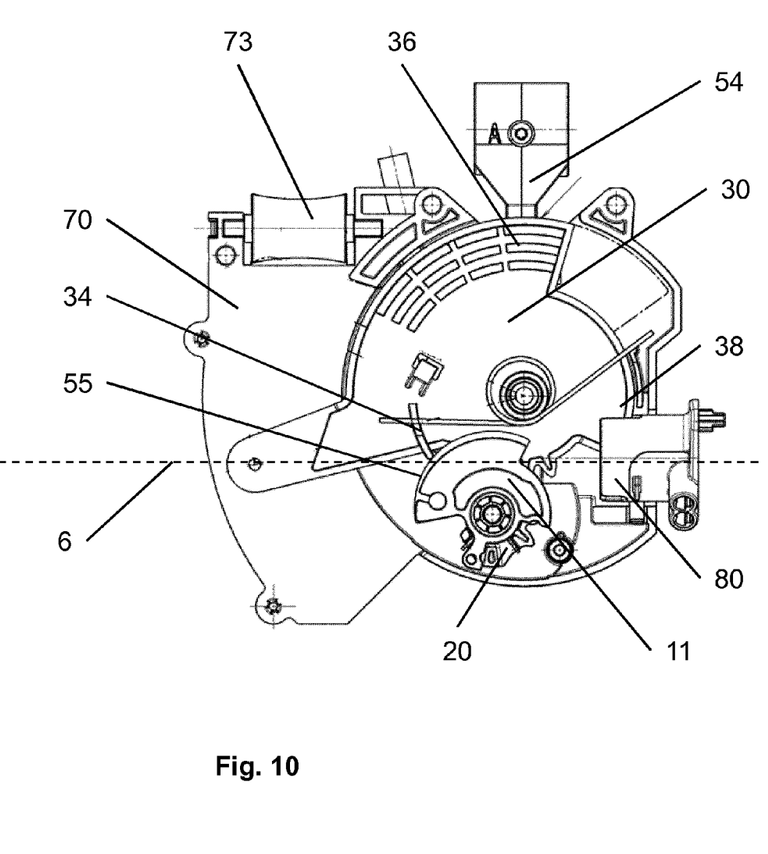
FIG. 10 is a front view of the interlocking unit according to FIG. 4 in the tumble position.

In the tumble position which is shown in FIG. 9 and FIG. 10, the unlocking lever 30 is situated in the hold-open position. Here, the blocking arm 36 is situated immediately in front of the blocking lever 54. During the attempt to unlock the backrest setting fittings 5, the blocking lever 54 comes into contact with the blocking arm 36. Unlocking of the backrest setting fittings 5 is therefore not possible in the tumble position of the vehicle seat 1.

The leadthrough element 80 which is fastened to the seat part 2 is of approximately cylindrical design, its cylinder axis being aligned with the backrest pivot axis 6. The leadthrough element 80 is therefore assigned kinematically to the seat part 2. During pivoting of the backrest 3 from the design position into the table position, the leadthrough element 80 therefore rotates relative to the unlocking unit.

The leadthrough element 80 has a diametrically running slot 78 on an end side which points in the transverse direction to the interior of the vehicle seat 1, that is to say faces the unlocking unit. The leadthrough element 80 is arranged in such a way that, when the vehicle seat 1 is situated in the table position, the slot 78 is aligned with a blocking lug 38 which is attached to the unlocking lever 30.

Figure 4:
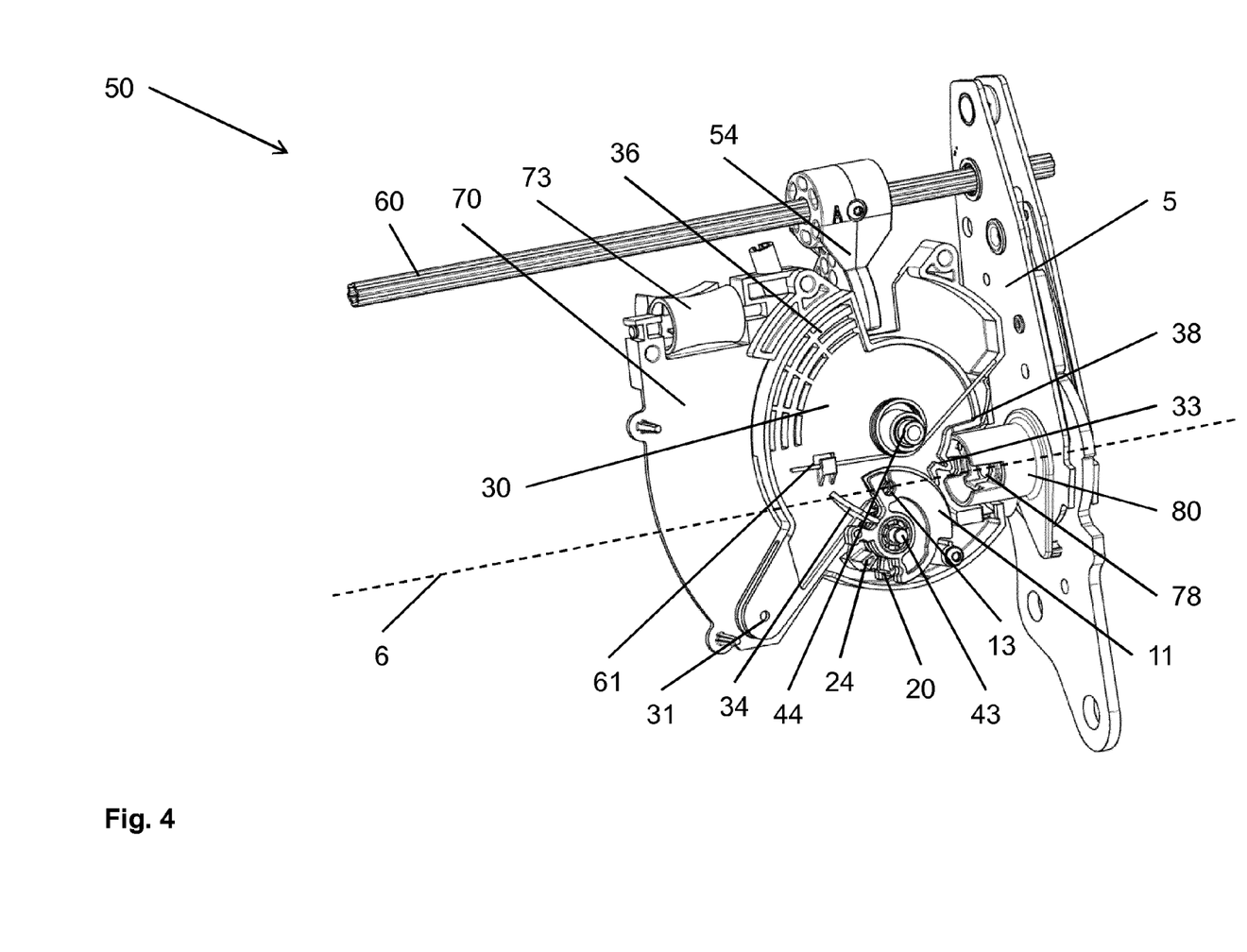
FIG. 4 is a perspective illustration of an interlocking unit according to the first exemplary embodiment.

When the vehicle seat 1 is situated in the design position, the slot 78 runs obliquely with respect to the movement direction of the blocking lug 38, as shown in FIG. 4 and FIG. 6. During the attempt to unlock the locking apparatuses 90, the blocking lug 38 of the unlocking lever 30 comes into contact with the cylinder shell of the leadthrough element 80. Unlocking of the locking apparatuses 90 is therefore not possible when the vehicle seat 1 is situated in the design position.

When the vehicle seat 1 is situated in the table position, the slot 78 runs in the same direction as the movement direction of the blocking lug 38, as shown in FIG. 8. The slot 78 is not visible in this illustration. During unlocking of the locking apparatuses 90, the blocking lug 38 pivots into the slot 78. Unlocking of the locking apparatuses 90 is therefore possible in the table position of the vehicle seat 1.

In the tumble position which is shown in FIG. 10, the unlocking lever 30 is situated in the hold-open position. Here, the blocking lug 38 of the unlocking lever 30 is situated within the slot 78 of the leadthrough element 80. In the tumble position, as described above, unlocking of the backrest setting fittings 5 is not possible. Even if the backrest setting fittings 5 were unlocked in the tumble position, a pivoting movement of the backrest 3 relative to the seat part 2 would not be possible. In this case, the edge regions of the slot 78 would come into contact with the blocking lug 38 and prevent a pivoting movement of the backrest 3 relative to the seat part 2.

According to a second exemplary embodiment which is shown in FIG. 11 to FIG. 20, the seat part 2 is connected fixedly to the vehicle structure. The vehicle seat 1 according to the second exemplary embodiment is of largely identical design to the vehicle seat 1 of the first exemplary embodiment. In the following text, approximately only differences between the first and the second exemplary embodiment will be described.

In the front region on both sides in the driving direction, the seat part 2 is articulated on the vehicle structure by way of in each case one four-bar linkage 7. Furthermore, as is also the case in the first exemplary embodiment, the seat part 2 has in each case one rear foot 9 on both sides in the rear region in the driving direction, which rear foot 9 comprises a locking apparatus 90.

Figure 13:
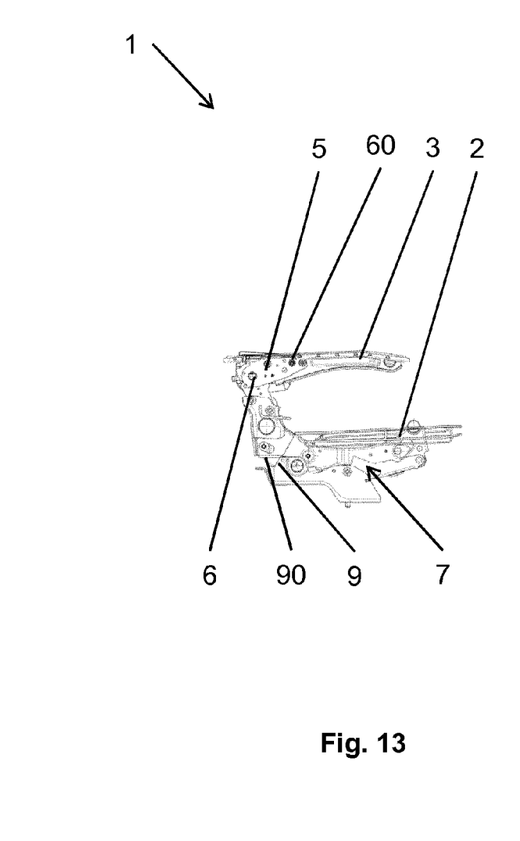
FIG. 13 is a diagrammatic illustration of a vehicle seat according to FIG. 11 in the dump position.
Figure 14:
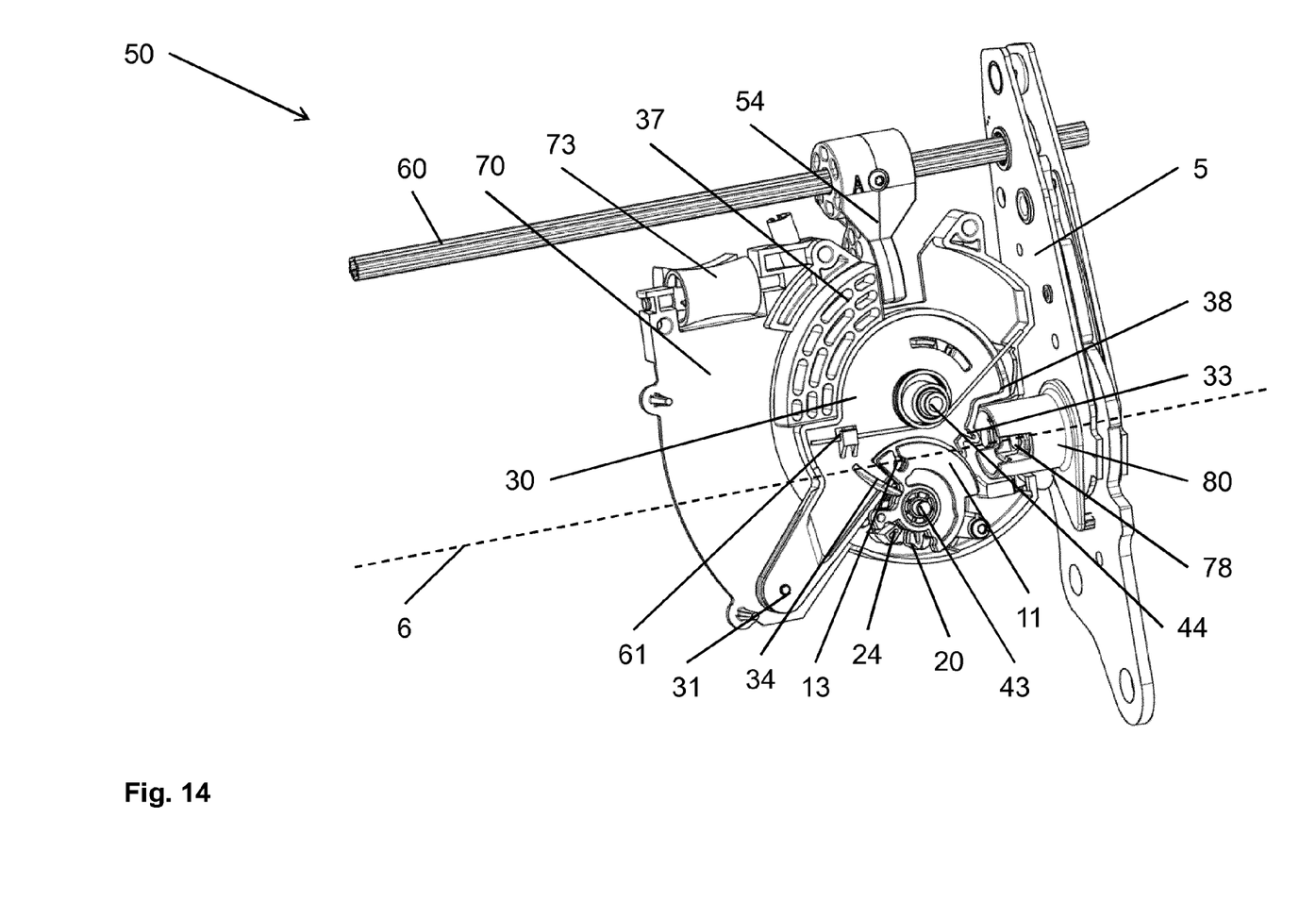
FIG. 14 is a perspective illustration of an interlocking unit according to the second exemplary embodiment.

By way of pivoting of the backrest 3 into a horizontal position, the vehicle seat 1 can likewise be transferred from a design position which is shown in FIG. 11 into a table position which is shown in FIG. 12. From the described table position, the vehicle seat 1 can be transferred into a dump position which is shown in FIG. 13. In the dump position of the vehicle seat 1, the backrest 3 rests on the seat part 2 and the seat part 2 is pivoted toward the front in the driving direction and downward in the vertical direction by means of the four-bar linkage 7. Here, the locking apparatuses 90 are locked to two different pins on the vehicle structure which are arranged further forward in the driving direction.

When the vehicle seat 1 is situated in the dump position, that is to say when the locking apparatuses 90 are locked, the two backrest setting fittings 5 must also not be unlocked for safety reasons.

The vehicle seat 1 according to the second exemplary embodiment which can be transferred into the dump position therefore additionally has a transmission unit (not shown) which, when the vehicle seat 1 is situated in the dump position, supplies a corresponding signal to the interlocking unit 50. The transmission unit comprises substantially a transmission Bowden cable which, when the vehicle seat 1 is situated in the dump position, pivots a transmission lever which can be pivoted about the actuating pivot axis 44. Here, the transmission lever interacts with an additional blocking segment 37 which is likewise mounted such that it can be pivoted about the actuating pivot axis 44. Here, the blocking segment 37 is arranged largely coaxially with respect to the unlocking lever 30.

Figure 15:
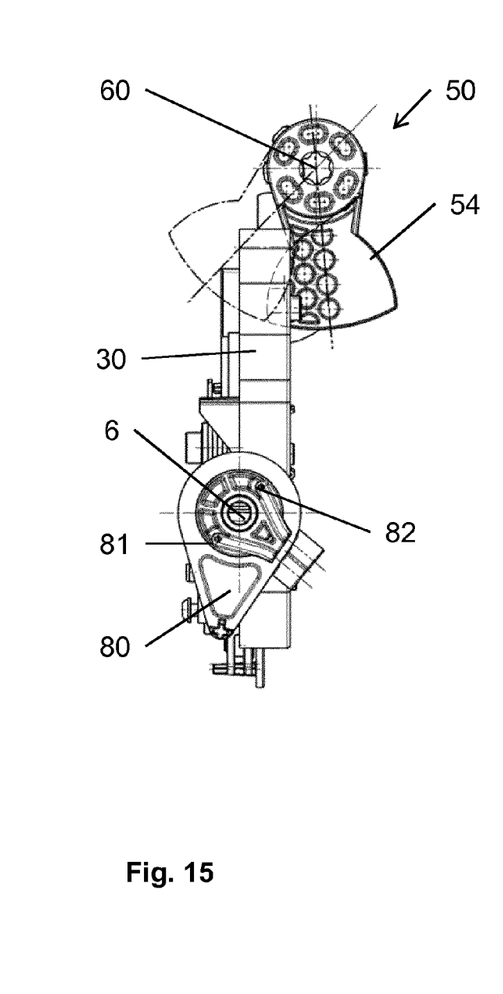
FIG. 15 is a side view of the interlocking unit according to FIG. 14 in the design position.
Figure 16:
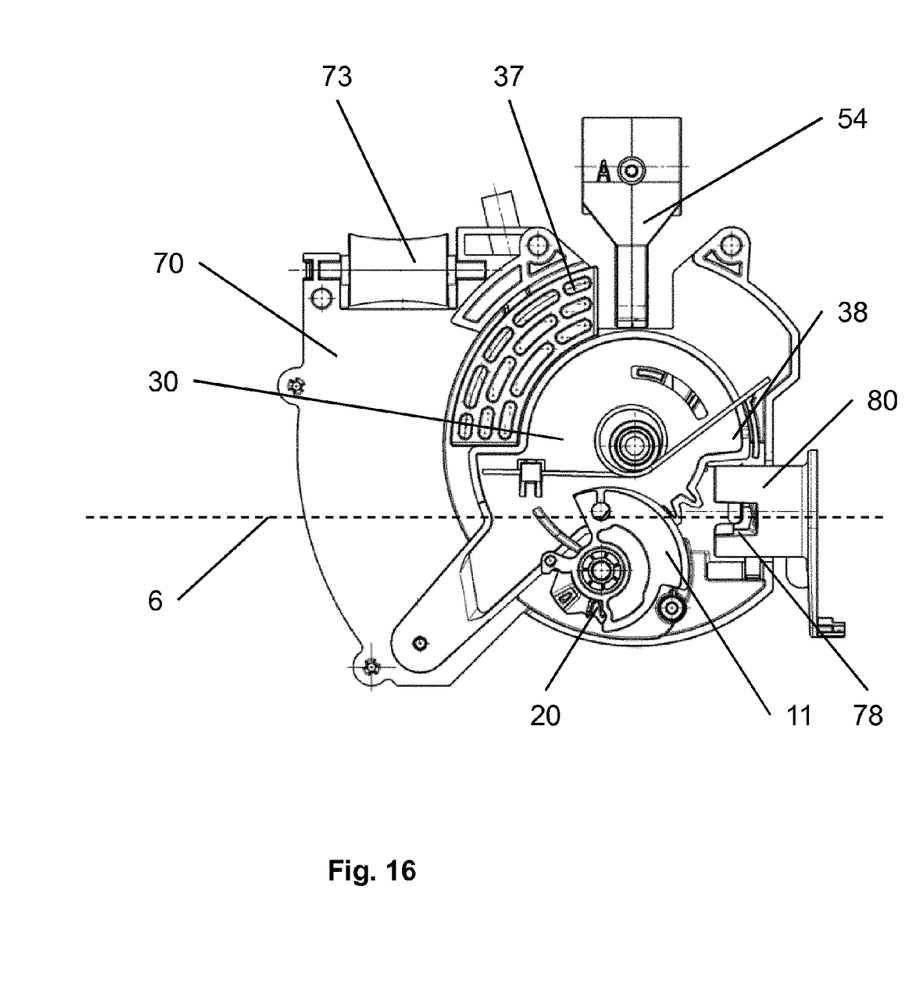
FIG. 16 is a front view of the interlocking unit according to FIG. 14 in the design position.
Figure 17:
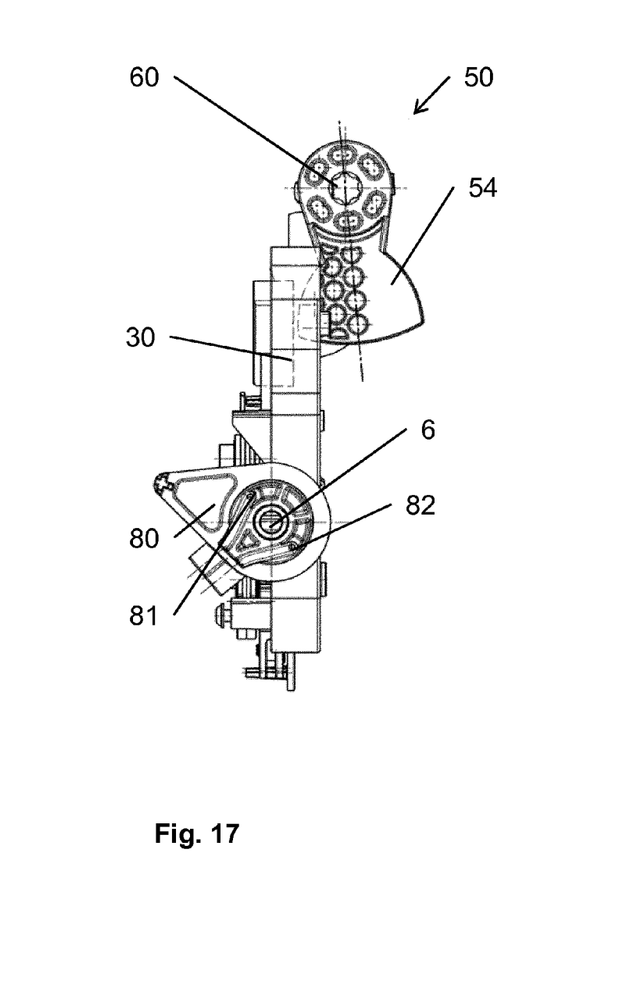
FIG. 17 is a side view of the interlocking unit according to FIG. 14 in the table position.
Figure 18:
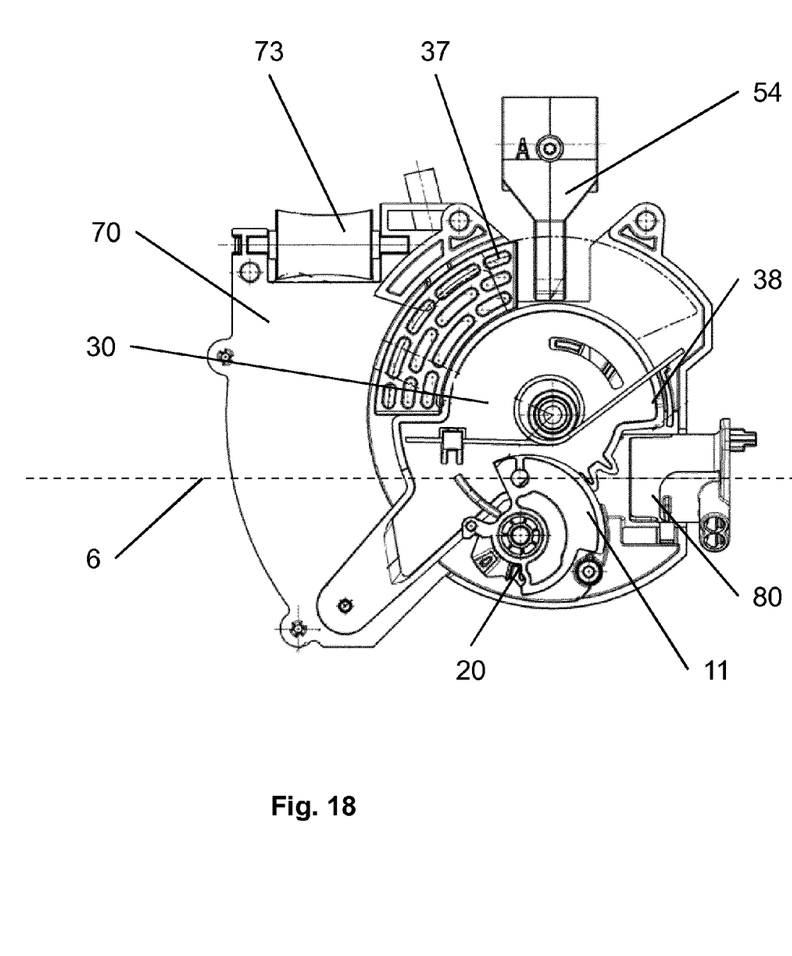
FIG. 18 is a front view of the interlocking unit according to FIG. 14 in the table position.

During a transition from the design position which is shown in FIG. 15 and FIG. 16 into the table position which is shown in FIG. 17 and FIG. 18, the leadthrough element 80 experiences a rotation relative to the backrest 3, as in the first exemplary embodiment, as a result of which the slot 78 is aligned with the blocking lug 38 which is attached to the unlocking lever 30.

In the illustration according to FIG. 15, the blocking lever 54 is also shown in the pivoted state for unlocking the backrest setting fittings 5, additionally using dashed-dotted outlines.

Figure 19:
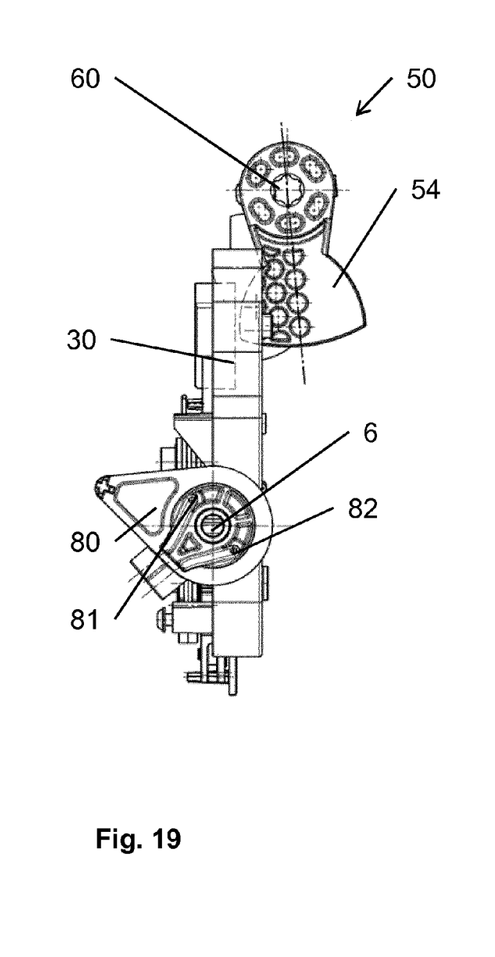
FIG. 19 is a side view of the interlocking unit according to FIG. 14 in the dump position.
Figure 20:
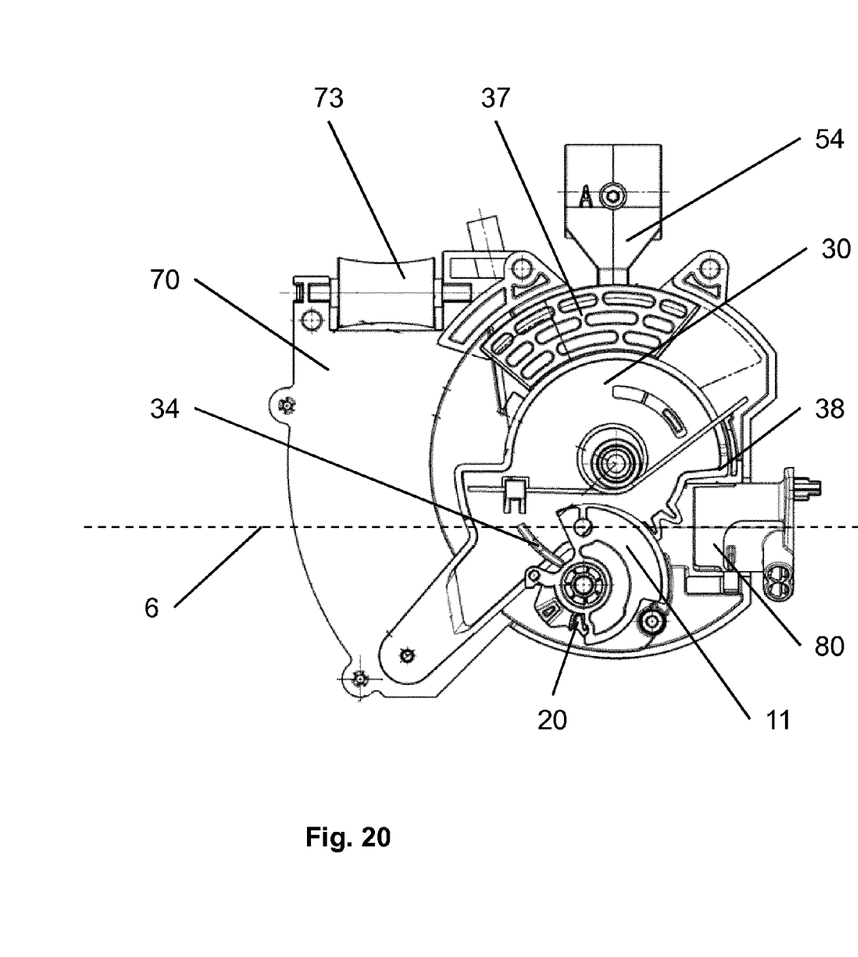
FIG. 20 is a front view of the interlocking unit according to FIG. 14 in the dump position.

During a transition from the table position which is shown in FIG. 17 and FIG. 18 into the dump position which is shown in FIG. 19 and FIG. 20, first of all, the locking apparatuses 90 are opened by way of pivoting of the unlocking lever 30. Here, the unlocking lever 30 drives the blocking segment 37 and pivots it in front of the blocking lever 54. The blocking segment 37 therefore prevents a movement of the blocking lever 54 and therefore unlocking of the backrest setting fittings 5 while one of the locking apparatuses 90 is open. As long as one of the locking apparatuses 90 is open, the unlocking lever 30 remains in the hold-open position and therefore also holds the blocking segment 37 in front of the blocking lever 54.

After the dump position is reached, the locking apparatuses 90 lock to the front pins on the vehicle structure, and the unlocking lever 30 pivots back into its rest position.

In the dump position, however, the blocking segment 37 is held in its position in front of the blocking lever 54 by the transmission lever which is pivoted by the transmission Bowden cable, and remains there. The blocking segment 37 therefore prevents a movement of the blocking lever 54 and therefore unlocking of the backrest setting fittings 5 while the vehicle seat 1 is situated in the dump position.

During the return from the dump position which is shown in FIG. 19 and FIG. 20 into the table position which is shown in FIG. 17 and FIG. 18, first of all the locking apparatuses 90 are opened by way of pivoting of the unlocking lever 30. Here, the unlocking lever 30 remains in the hold-open position as long as one of the locking apparatuses 90 is open.

During the movement of the seat part 2 toward the rear, the transmission Bowden cable releases the transmission lever which thereupon pivots back in a spring-loaded manner. As a result, the transmission lever also releases the blocking segment 37 which, however, is still held in the position in front of the blocking lever 54 by way of the unlocking lever 30.

After the table position is reached, the unlocking lever 30 pivots back into its hold-open position and therefore also releases the blocking segment 37. Thereupon, the blocking segment 37 pivots back in a spring-loaded manner and releases the blocking lever 54.

The features which are disclosed in the above description, the claims and the drawings can be of significance both individually and in combination for the realization of the invention in its different refinements.

While specific embodiments of the invention have been shown and described in detail to illustrate the application of the principles of the invention, it will be understood that the invention may be embodied otherwise without departing from such principles.

The invention claimed is:
1. An adjustable vehicle seat comprising:
a seat part;
a backrest;
a backrest setting fitting, the backrest pivoting relative to the seat part about a backrest pivot axis by means of the backrest setting fitting and can be locked in a plurality of angular positions;
a locking apparatus locking the seat part to a vehicle structure;
an unlocking lever transmitting an introduced movement for unlocking to the locking apparatus;
a transmission rod;

an interlocking element which, when the backrest setting fitting is unlocked, prevents a movement of the unlocking lever for unlocking the locking apparatus, and which, when the locking apparatus is unlocked, prevents unlocking of the backrest setting fitting, the interlocking element being configured as a blocking lever which is connected fixedly to the transmission rod so as to rotate with the transmission rod, unlocking of the backrest setting fitting taking place during a rotation of the transmission rod and the unlocking lever having a blocking element or the unlocking lever interacting with a blocking element, wherein the blocking element, when the locking apparatus is unlocked, prevents a movement of the blocking lever for unlocking the backrest setting fitting.

2. The adjustable vehicle seat as claimed in claim 1, further comprising another backrest setting fitting such that two backrest setting fittings are provided, wherein the transmission rod serves for simultaneous unlocking of both of the two backrest setting fittings.

3. The adjustable vehicle seat as claimed in claim 1, wherein, when the backrest setting fitting is unlocked, the blocking lever prevents a movement of the blocking element for unlocking the locking apparatus.

4. The adjustable vehicle seat as claimed in claim 1, wherein the interlocking element is a first interlocking element and further comprising a second interlocking element which, when the backrest is approximately upright, prevents a movement of the unlocking lever for unlocking the locking apparatus.

5. The adjustable vehicle seat as claimed in claim 4, wherein, when the backrest rests on the seat part, the second interlocking element permits a movement of the unlocking lever for unlocking the locking apparatus, and which second interlocking element, when the locking apparatus is unlocked, prevents a pivoting movement of the backrest relative to the seat part.

6. The adjustable vehicle seat as claimed in claim 4, wherein the second interlocking element is configured as a leadthrough element of approximately cylindrical design which is fastened to the seat part in such a way that a second interlocking element cylinder axis is aligned with the backrest pivot axis.

7. The adjustable vehicle seat as claimed in claim 6, wherein the leadthrough element has two leadthrough openings for leading through Bowden cables.

8. The adjustable vehicle seat as claimed in claim 6, wherein the leadthrough element has an end side with a diametrically running slot which, when the backrest rests on the seat part, is aligned with a blocking lug which is attached to the unlocking lever.

9. The adjustable vehicle seat as claimed in claim 8, wherein, when the locking apparatus is unlocked, the blocking lug is situated within the slot.

10. The adjustable vehicle seat as claimed in claim 8, further comprising a return spring that loads the unlocking lever constantly in the direction of a rest position, in which the unlocking lever is situated when the locking apparatus is locked.

11. The adjustable vehicle seat as claimed in claim 1, further comprising another locking apparatus locking the seat part to a vehicle structure wherein precisely two locking apparatuses are provided.

12. The adjustable vehicle seat as claimed in claim 1, wherein the unlocking lever can be pivoted about an actuating pivot axis which runs at right angles with respect to the backrest pivot axis.

13. The adjustable vehicle seat as claimed in claim 1, wherein the blocking element comprises a blocking arm which is configured in one piece with the unlocking lever.

14. The adjustable vehicle seat as claimed claim 1, wherein the blocking element comprises a blocking segment which is configured separately from the unlocking lever.

15. The adjustable vehicle seat as claimed in claim 14, wherein the blocking segment and the unlocking lever are mounted such that the blocking segment and the unlocking lever can be pivoted about an identical actuating pivot axis.

* * * * *